United States Patent [19]

Noren et al.

[11] Patent Number: 4,508,889

[45] Date of Patent: Apr. 2, 1985

[54] PREPARATION OF ISOCYANATE-TERMINATED POLYURETHANES CONTAINING AMINO SILANES

[75] Inventors: Gerry K. Noren, Hoffman Estates; Erwin S. Poklacki, Arlington Heights; Fred D. Hawker, Villa Park; Janice M. Sich, Chicago, all of Ill.

[73] Assignee: DeSoto, Inc., Des Plaines, Ill.

[21] Appl. No.: 632,613

[22] Filed: Jul. 19, 1984

[51] Int. Cl.³ .............................................. C08G 18/38
[52] U.S. Cl. ........................................ 528/28; 528/905
[58] Field of Search ........................................... 528/28

[56] References Cited

U.S. PATENT DOCUMENTS

| | | | |
|---|---|---|---|
| 3,632,557 | 1/1972 | Brode et al. | 528/28 |
| 4,345,053 | 8/1982 | Rizk et al. | 528/28 |
| 4,374,237 | 2/1983 | Berger et al. | 528/28 |
| 4,468,492 | 8/1984 | Piccivilli et al. | 525/102 |

Primary Examiner—Maurice J. Welsh
Attorney, Agent, or Firm—Dressler, Goldsmith, Shore, Sutker & Milnamow, Ltd.

[57] ABSTRACT

A process is disclosed in which polyalkoxy amino silane adhesion promoters are incorporated into isocyanate-functional polyurethane resins formed by the reaction of a stoichiometric excess of organic polyisocyanate with an hydroxy-functional resin without producing cloudy and/or unstable resin solutions. In this process, the hydroxy-functional resin is prereacted with the alkoxy functionality of the amino silane in a reaction which liberates alcohol, and then a stoichiometric excess of the organic polyisocyanate is added to cause the isocyanate groups of the polyisocyanate to react with both the hydroxy groups and the amino hydrogen atoms present.

14 Claims, No Drawings

PREPARATION OF ISOCYANATE-TERMINATED POLYURETHANES CONTAINING AMINO SILANES

DESCRIPTION

1. Technical Field

This invention relates to the production of isocyanate-terminated polyurethanes which include amino silane adhesion promoting agents.

2. Background Art

Isocyanate-terminated polyurethanes are well known and commonly used in organic solvent solution adhesives and coatings. These include two-component coatings and adhesives wherein the curing agent which reacts with the isocyanate functionality is in the second component. These also include single-component moisture-curing systems. These compositions are usually unpigmented when used as adhesives, and pigmented when used as coatings. It is desired to maximize adhesion to the substrate, the usual substrates being metallic substrates, such as aluminum or steel.

Polyalkoxy amino silanes are known adhesion promoters, and it is desired to incorporate them into isocyanate-functional polyurethane resin solutions. The resins are formed by the reaction of a stoichiometric excess of organic polyisocyanate with an hydroxy-functional resin or mixture of resins. However, addition of the amino silane during the preparation of the isocyanate-terminated polyurethane or after its formation tends to produce undesirable cloudy and/or unstable resin solutions. The difficulty increases with the proportion of added amino silane. It is preferred to use more than 0.3% of the amino silane based on the weight of the polyurethane to obtain good performance, and these amounts of amino silane cannot be tolerated in the resins produced in accordance with prior art procedures.

As a matter of interest, the amino silane contains two types of reactive groups, namely: amino hydrogen atoms which are strongly reactive with isocyanate functionality to produce urea groups, and alkoxy groups which do not react with isocyanate functionality. It appears that urea formation leads to the insolubility which creates cloudy and unstable compositions. However, the amino hydrogen atoms are reactive only with isocyanate groups in the combination under consideration, and the reaction takes place at room temperature. As a result, urea group formation cannot be prevented where excess isocyanate is necessarily present, and the clouding and instability problem raised by urea group formation has no evident solution.

DISCLOSURE OF INVENTION

In accordance with this invention, we overcome the clouding and instability problem noted previously by prereacting an hydroxy-functional resin (discussed more fully hereinafter) with a polyalkoxy amino silane via its alkoxy functionality, alcohol being liberated in this known reaction. This binds the amino silane molecules to the hydroxy-functional resin and thus physically separates the amino silane molecules from one another. When organic polyisocyanate is now added in stoichiometric excess, the isocyanate groups will react with both the hydroxy groups and the amino hydrogen atoms, the latter reaction being preferential. However, the aminosilane molecules are now tied to the hydroxy-functional resin and they are not free to move around and form clusters of poorly soluble urea groups. This appears to avoid the previously troublesome clouding and instability which prevented the use of effective amounts of the amino silane adhesion promoters.

This invention thus provides a process for incorporating polyalkoxy amino silane adhesion promoters into isocyanate-functional polyurethane resins formed by the reaction of a stoichiometric excess of organic polyisocyanate with an hydroxy-functional resin without producing cloudy and/or unstable resin solutions. This process comprises prereacting the hydroxy-functional resin with the alkoxy functionality of the amino silane in a reaction which liberates alcohol, and then adding a stoichiometric excess of the organic polyisocyanate to cause the isocyanate groups of the polyisocyanate to react with both the hydroxy groups and the amino hydrogen atoms present, whereby the previously troublesome clouding and instability which prevented the use of effective amounts of the amino silane adhesion promoters is avoided.

To illustrate the significance of this invention, isocyanate-functional polyurethane coating compositions lacking amino silane and which were previously of only marginal interest because metal substrates coated with the prior art polyurethane coating and cured failed a standard water soak test after only 4 days immersion of the cured coated substrate in 130° F. water, have been modified by the addition of about 0.8% of amino silane to sustain more than 4 weeks in the same test. More than about 0.2% of amino silane could not previously be incorporated because the product containing the added silane was cloudy and unstable. In the test, the coating is cut to the substrate base metal in a cross-hatched pattern and immersed in the heated water. After removal from the heated water, the coated substrate is allowed to dry in air. An adhesive tape is pressed onto the dried cut coating and the tape is then peeled off. The coating passes the test if it stays on the substrate, and it fails the test if it is removed with the tape.

The hydroxy-functional resins which may be used herein include any solvent-soluble polymer which carries hydroxy groups which are reactive with isocyanate functionality. While hydroxy-functional resins which are di-, tri-, or tetra-functional are preferred, as will be described, the invention is not so-limited, and one can employ epoxy esters, such as the diester of linseed fatty acid with a diglycidyl ether of bisphenol A having a molecular weight of about 1000. Other hydroxy-functional resins which are useful are polyester resins, such as the polyesterification product of phthalic anhydride and glycerin. Hydroxy-functional polyether resins are preferred since these are available with two, three or four hydroxy groups per molecule. The dihydric polyethers are particularly desirable, and these include polyoxyethylene glycol. Polyoxypropylene glycol and polytetramethylene glycols are less water-sensitive and are preferred for that reason. One will preferably use $C_2$–$C_4$ alkylene oxide adducts with di-, tri- and tetrahydric alcohols to provide the preferred hydroxy-functional resins noted previously. The alkylene oxides are illustrated by ethylene oxide, propylene oxide and butylene oxide, and the alcohols are illustrated by ethylene glycol, 1,4-butylene glycol, trimethylol propane, and pentaerythritol. The propylene oxide adduct of trimethylol propane having a molecular weight of about 450 is illustrative, particularly in combination with other polyols.

The polyalkoxy amino silanes which are used herein are known adhesion promoters, and they include any silane which contains more than one alkoxy group per molecule and at least one amino hydrogen atom which is reactive with isocyanate functionality. The alkoxy groups contemplated contain from 1 to 4 carbon atoms, and include methoxy, ethoxy, propoxy and butoxy groups. The methoxy group is preferred because it is most easily reacted with the hydroxy groups of the hydroxy-functional resin.

The amino silanes useful herein are available in commerce from various sources and are illustrated by 2-aminoethyl 3-aminopropyl trimethoxy silane. Other amino silanes which may be used are illustrated by gamma-aminopropyl triethoxy silane and N-beta-(N-vinylbenzylamino-ethyl)-gamma-aminopropyl trimethoxy silane, and methyl-[2-(gamma-trimethoxysilyl-propylamino)-ethylamino]-3-propionate.

Preferred silanes have the following structural formula:

in which R is $C_1$–$C_4$ alkyl, preferably methyl or ethyl, R' is an aliphatic group containing from 1 to 10 carbon atoms, preferably an alkylene group, such as ethylene or propylene, X is —$NH_2$ or —NR"H where R" is $C_1$–$C_6$ alkyl amine, such as ethyl, propyl, or butyl amine, and y and n total 4 with y being at least 1 and n being more than 1, preferably 3. Products in which X is —NR"H in which R" is an alkyl amine provide diamines which are particularly preferred for use herein.

When reaction involving the alkoxy group occurs, alcohol is liberated. Since the reaction is usually carried out with the aid of heat, the alcohol produced is vaporized and can be condensed using a typical condenser. The greater the reaction with the alkoxy reactant, the more amino silane can be tolerated, and it is especially preferred that at least 0.5% be present of the aminosilane be present in the final product based on total resin solids. It is preferred that enough alcohol be produced to couple at least about 30% of the amino silane molecules to the hydroxy-functional resin. As will be evident, the more the amino silane is tied up, the smaller the risk of clouding and separation, and this will vary with the amount of amino silane used and with hydroxy-functional resin which is selected.

Organic polyisocyanates include any organic compound which contains at least two isocyanate groups. Triisocyanates, like the biuret of hexamethylene diisocyanate, are also useful, but diisocyanates are preferred. The diisocyanates are illustrated by diphenyl methane diisocyanate, toluene diisocyanate and isophorone diisocyanate. When the polyisocyanates are heated with an hydroxy-functional resin, and a catalyst facilitating the urethane reaction, like dibutyl tin dilaureate, may be present, the isocyanate reacts easily and rapidly until all the hydroxy groups are consumed. The amino hydrogen atoms present are even more strongly reactive than the hydroxy groups, and these are preferentially consumed.

Throughout this document, all parts and proportions are by weight unless otherwise stated.

The invention will be illustrated in the following examples.

EXAMPLE 1

To a 2000 ml. flask equipped with a condenser including a Dean Stark trap and a nitrogen sparge were charged 95.85 parts of polyoxybutylene glycol having a molecular weight of about 650 (the DuPont product Teracol 650 may be used), 3.43 parts of the propylene oxide adduct of pentaerythritol (the BASF product Pluracol PEP 450 may be used) and 0.72 parts 2-aminoethyl 3-aminopropyl trimethoxy silane (the Union Carbide product A-1120 may be used). The flask was heated for 15 minutes to increase the temperature to about 100° C. and held at that temperature for one-half hour before cooling was started. The flask was cooled to 40° C. in about one-half hour. An analysis of the material in the trap revealed one-half water and one-half methanol, thus establishing the reaction between the hydroxy groups of the hydroxy-functional resins and the methoxy groups in the silane.

EXAMPLE 2

300 parts of diphenyl methane diisocyanate (the Mobay product Mondur M may be used) were charged to a 3000 ml. flask having a nitrogen sparge and heated to 60° C. 359.36 parts of the prereacted hydroxy resins of Example 1 were then added to the flask at such a rate as to balance the exothermic reaction against the heat loss to the surroundings, and thus keep the temperature in the flask between 60° C. and 65° C. A nitrogen blanket is used throughout the addition of the hydroxy resins. After all the hydroxy resin of Example 1 had been added, the flask was heated to maintain 65° C. for one hour or until analysis of a specimen indicated that the isocyanate content had been reduced to about 7.7%. The product was then diluted with 658.05 parts of methyl ethyl ketone, and the flask was cooled. The resulting solution product was a clear, colorless resin solution having a solids content of 51.03% and an isocyanate content of 3.85%, and it was stable on storage. This solution provides a moisture-curing coating composition for aluminum substrates, and the presence of the amino silane improves adhesion as indicated by the water soak adhesion testing described previously.

EXAMPLE 3 (COMPARISON)

750 parts of diphenyl methane diisocyanate were charged to a dry 5000 ml flask fitted with a $N_2$ inlet, thermometer, stirrer and condenser. The flask was heated to 55° C. to melt the diisocyanate, whereupon a homogeneous mixture of 847 parts of polyoxybutylene glycol, 30.25 parts of propylene oxide adduct of pentaerythritol, molecular weight 450, and 6.5 parts of 2-aminoethyl-3-aminopropyl trimethoxy silane were added slowly over 70 minutes with cooling to control the exotherm and hold the temperature between 60° C. and 65° C. The reactor product was then heated for an additional hour at 65° C., at which time a sample indicated a 7.7% NCO content. The resin was cloudy, and examination under a 100 power microscope showed small amorphous opaque particles dispersed throughout the resin. With time, the cloudiness increased. Neither additional heat nor longer cooking was able to clarify the resin. Thus, without the prereaction of the polyol and the amino silane, a cloudy and unstable resin results.

As should now be evident, the product produced by the process of this invention is a different product.

What is claimed is:

1. A process of incorporating polyalkoxy amino silane adhesion promoters into isocyanate-functional polyurethane resins formed by the reaction of a stoichiometric excess of organic polyisocyanate with an hydroxy-functional resin without producing cloudy and/or unstable resin solutions comprising, prereacting said hydroxy-functional resin with the alkoxy functionality of said amino silane in a reaction which liberates alcohol, and then adding a stoichiometric excess of said organic polyisocyanate to cause the isocyanate groups of said polyisocyanate to react with both the hydroxy groups and the amino hydrogen atoms present, whereby the previously troublesome clouding and instability which prevented use of effective amounts of the amino silane adhesion promoters is avoided.

2. A process as recited in claim 1 in which said organic polyisocyanate is a diisocyanate.

3. A process as recited in claim 1 in which said hydroxy-functional resin is a di-, tri-, or tetra-functional dihydric polyether.

4. A process as recited in claim 1 in which said hydroxy-functional resin is a dihydric resin selected from polyoxyethylene glycol, polyoxypropylene glycol and polytetramethylene glycol.

5. A process as recited in claim 4 in which said hydroxy-functional resin is a polytetramethylene glycol.

6. A process as recited in claim 4 in which said hydroxy-functional resin includes propylene oxide adduct of trimethylol propane.

7. A process as recited in claim 1 in which said amino silane has the structural formula:

$$(X-R')_y Si-OR)_n$$

in which R is $C_1$–$C_4$ alkyl, R' is an aliphatic group containing from 1 to 10 carbon atoms, X is —$NH_2$ or —NR"H where R" is $C_1$–$C_6$ alkyl amine, and y and n total 4 with y being at least 1 and n being more than 1.

8. A process as recited in claim 7 in which R' is an alkylene group and X is —NR"H where R" is an alkyl amine.

9. A process as recited in claim 8 in which n is 3.

10. A process as recited in claim 7 in which said amino silane is present in an amount of at least about 0.3% based on the total weight of resin solids present.

11. A process as recited in claim 10 in which said amino silane contains more than one methoxy group per molecule.

12. A process as recited in claim 11 in which at least about 30% of said methoxy groups are reacted with said hydroxy-functional resin, and said amino silane is present in an amount of at least about 0.5% based on the total weight of resin solids present.

13. The product of the process of claim 1.

14. The product of the process of claim 12.

* * * * *

UNITED STATES PATENT AND TRADEMARK OFFICE
CERTIFICATE OF CORRECTION

PATENT NO. : 4,508,889
DATED : April 2, 1985
INVENTOR(S) : Gerry K. Noren et al.

It is certified that error appears in the above-identified patent and that said Letters Patent is hereby corrected as shown below:

At Column 3, line 22 and in Claim 7, line 3, the formula printed as $(X-R')_y Si-OR)_n$ should read:

-- $(X-R'\!\!\rightarrow_y Si \!\!\leftarrow\!\! OR)_n$ --

Signed and Sealed this

Sixteenth Day of July 1985

[SEAL]

Attest:

DONALD J. QUIGG

*Attesting Officer*     *Acting Commissioner of Patents and Trademarks*